United States Patent [19]

Hasegawa

[11] Patent Number: 4,974,072

[45] Date of Patent: Nov. 27, 1990

[54] IMAGE READING APPARATUS HAVING A PLURALITY OF LINE SENSORS AND MEANS FOR CORRECTING CROSSTALK THEREBETWEEN

[75] Inventor: Shizuo Hasegawa, Tokyo, Japan

[73] Assignee: Canon Kabushiki Kaisha, Tokyo, Japan

[21] Appl. No.: 255,977

[22] Filed: Oct. 11, 1988

[30] Foreign Application Priority Data

Oct. 14, 1987 [JP] Japan .................. 62-258801

[51] Int. Cl.⁵ .............................. H04N 1/46
[52] U.S. Cl. ...................... 358/80; 358/75; 358/77
[58] Field of Search ............... 358/75, 77, 80, 482, 358/213.15, 213.18

[56] References Cited

U.S. PATENT DOCUMENTS 4,750,048 6/1988 Satoh et al. ............... 358/287
4,891,690 1/1990 Hasegawa et al. ............... 358/75

Primary Examiner—James J. Groody
Assistant Examiner—Kim Yen Vu
Attorney, Agent, or Firm—Fitzpatrick, Cella, Harper & Scinto

[57] ABSTRACT

An image reading apparatus has a plurality of line sensors for reading an image, a pulse generator for independently driving the plurality of line sensors under the control of a CPU, and black level correction circuits for correcting black levels of output image signals from the plurality of line sensors. The black level correction circuits perform different black level correction operations for crosstalk portions than for other portions generated by the plurality of line sensors.

14 Claims, 15 Drawing Sheets

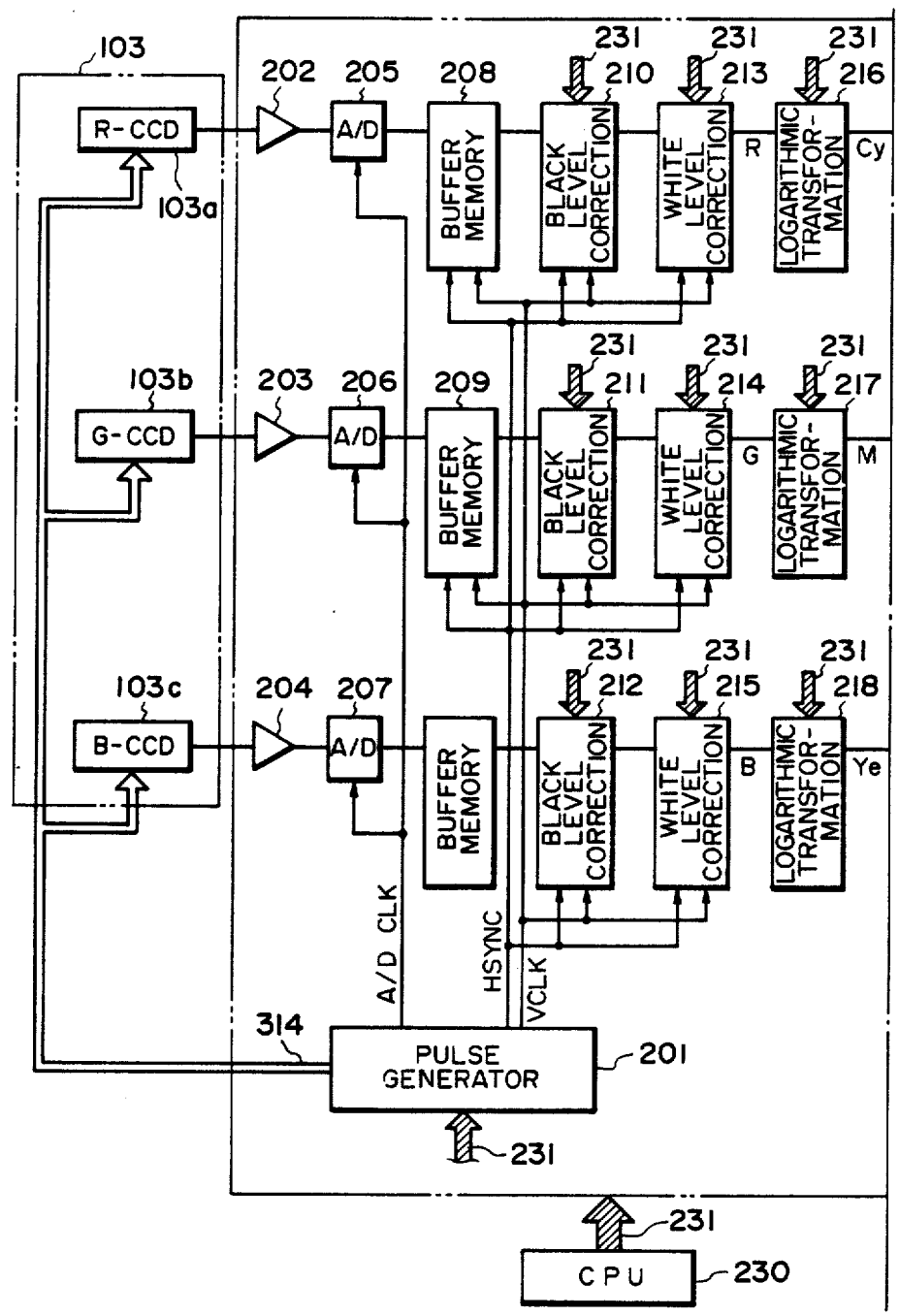
F I G. 3A

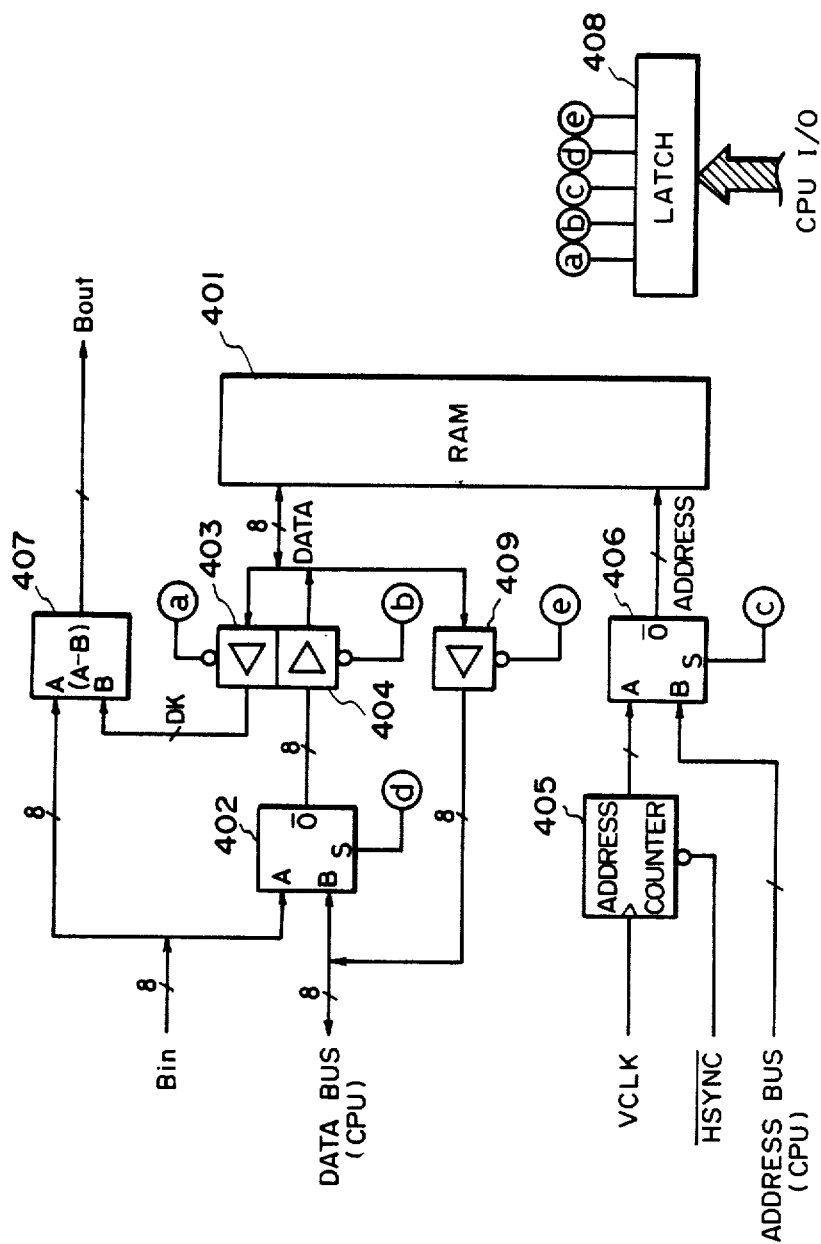
F I G. 4

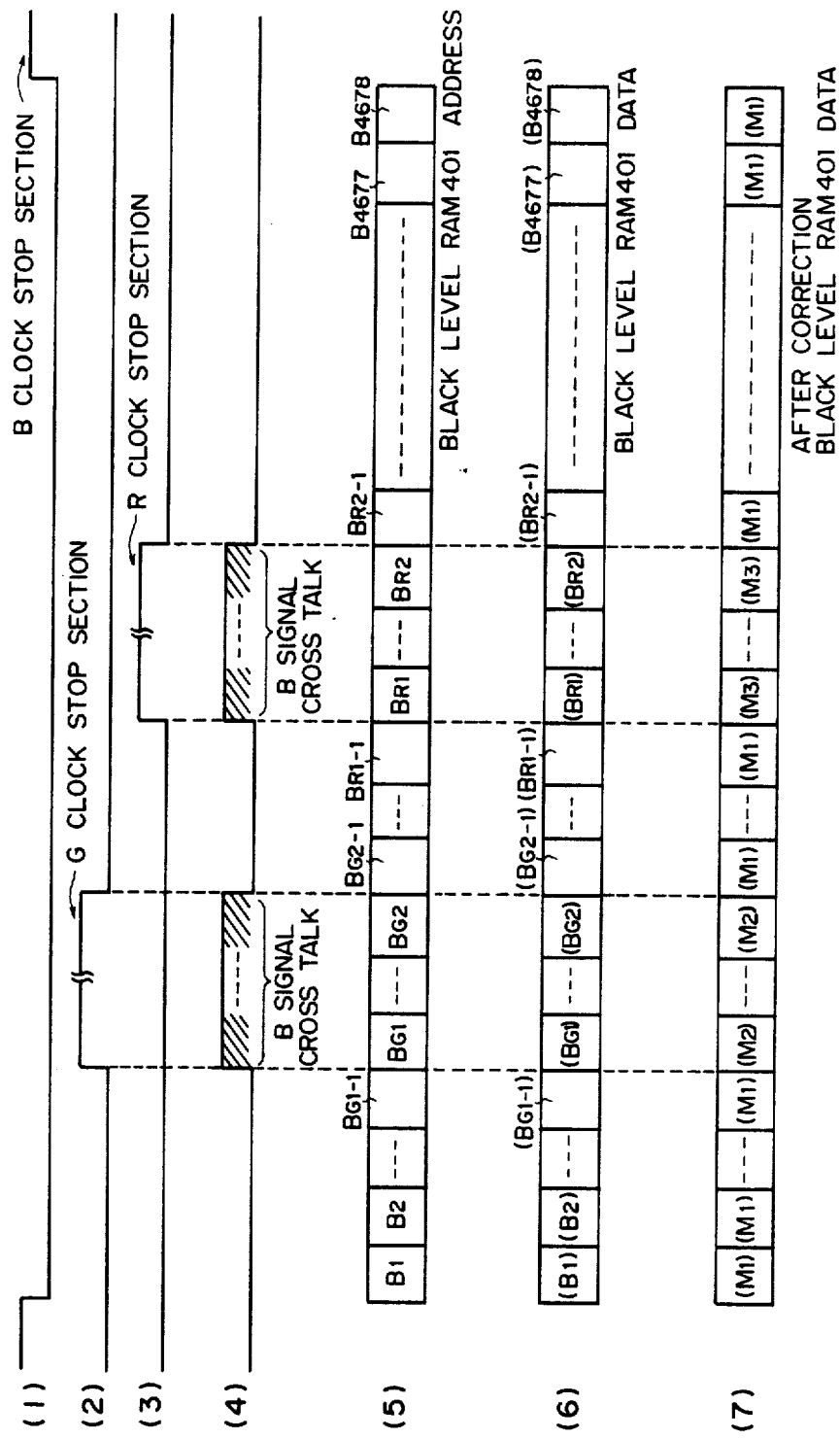
FIG. 10A (Bg2<Br1)

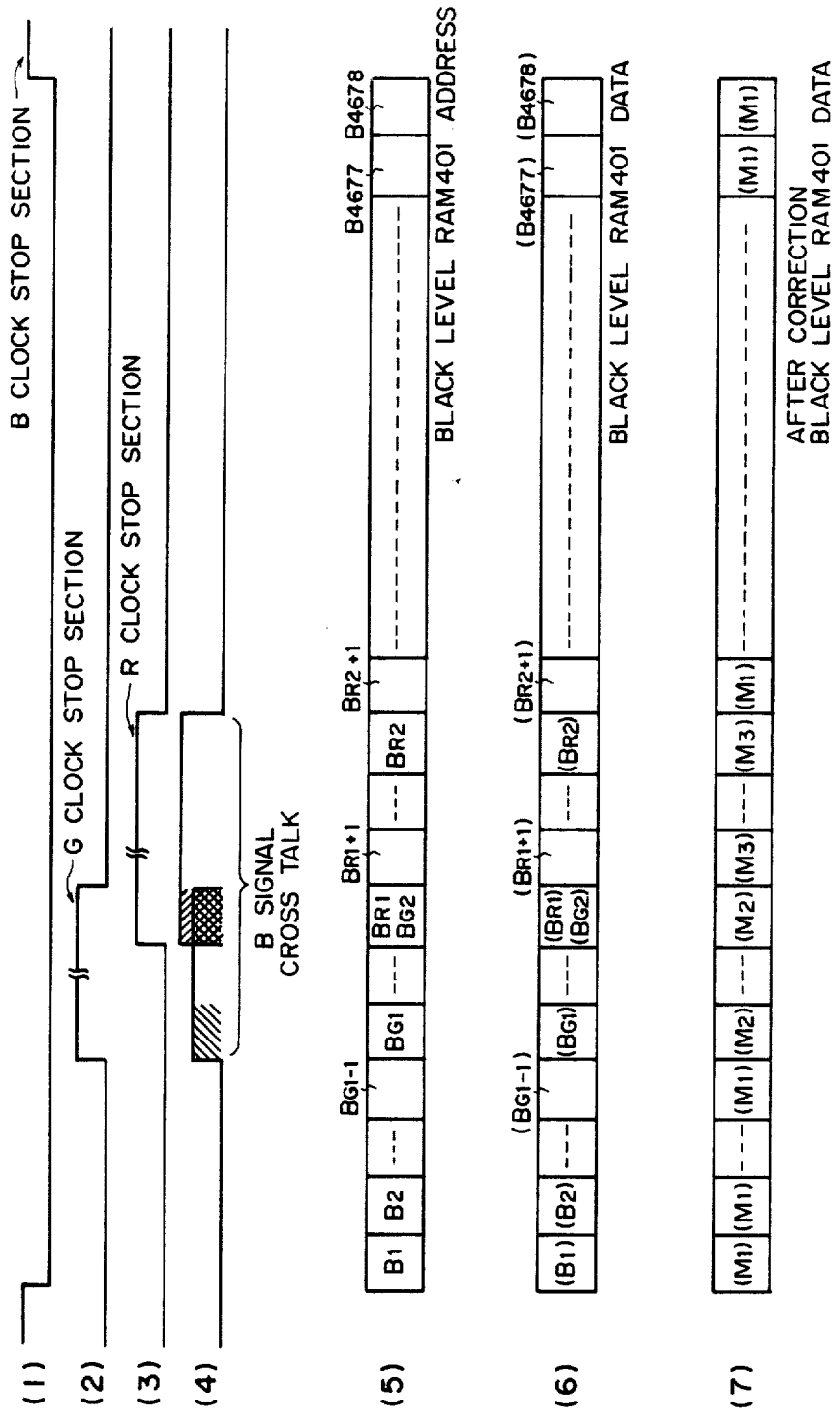
FIG. 10C  (BG2 = BR1)

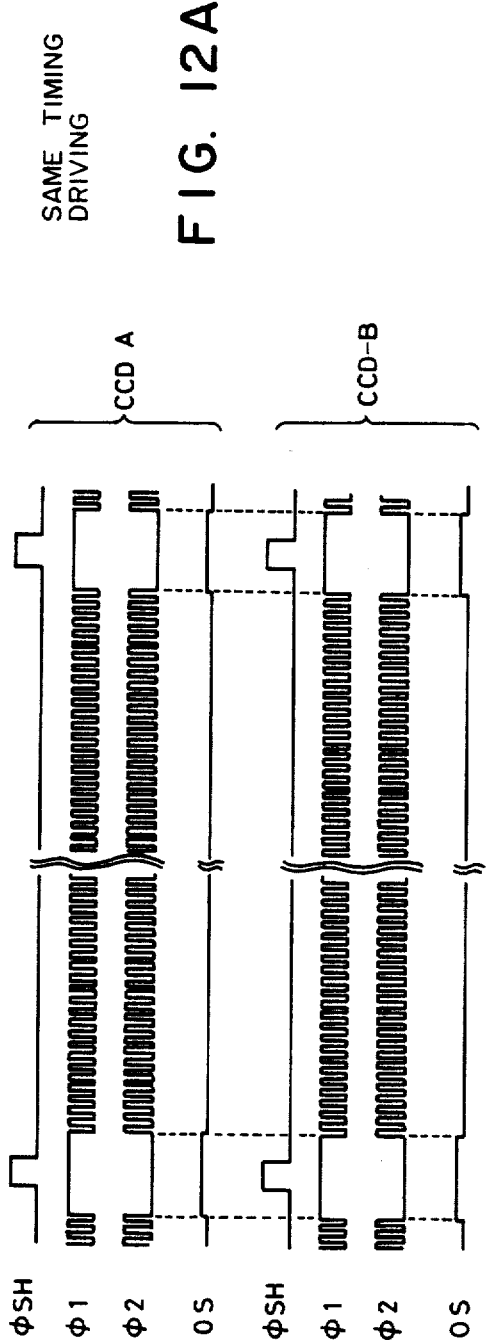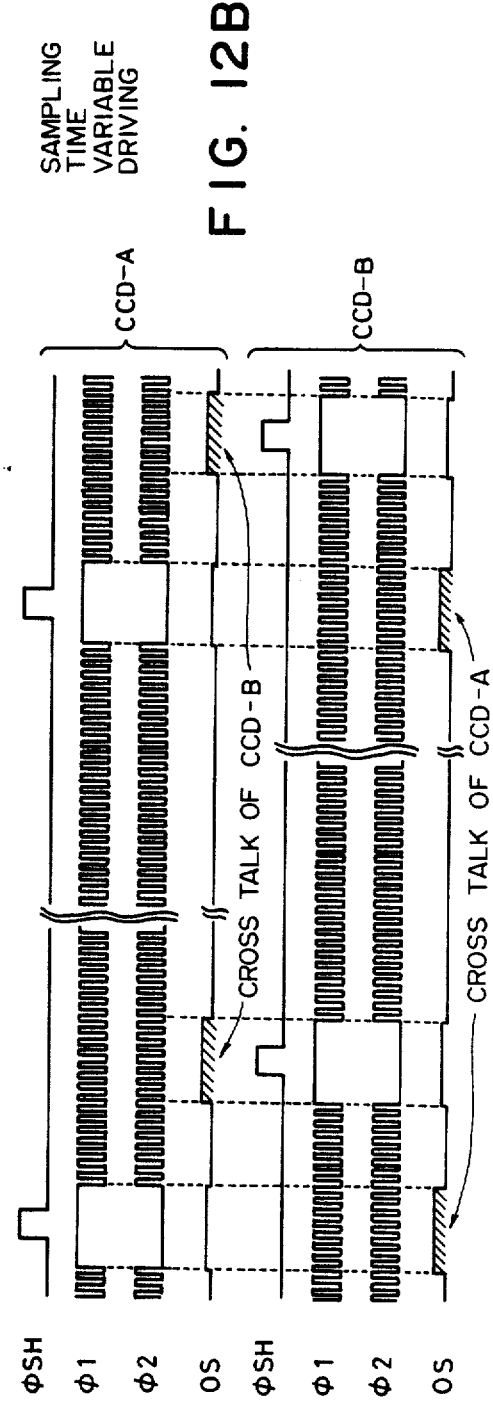

4,974,072

IMAGE READING APPARATUS HAVING A PLURALITY OF LINE SENSORS AND MEANS FOR CORRECTING CROSSTALK THEREBETWEEN

BACKGROUND OF THE INVENTION:

1. Field of the Invention

The present invention relates to an image reading apparatus for reading an image by using line sensors.

2. Description of the Related Art

Conventional line sensors used in image reading are classified into silicon crystal type sensors (e.g., CCD and bipolar sensors) and thin-film type sensors (e.g., CdS and amorphous silicon sensors). Their optical arrangements are classified into reduction and one-to-one magnification type sensors. Color image reading apparatuses are classified into a system for switching light sources or color filters by using a single line sensor to sequentially obtain a plurality of color component signals, and a system for simultaneously reading color components to obtain a plurality of color component signals without switching the light sources or color filters.

The simultaneously read color separation systems are further classified into a system which employs stripe filters in a one-line sensor to sequentially and time-divisionally read the color separation signals in accordance with a dot sequence, and a system which employs parallel line sensors in units of separation colors to read out the color separation signals in accordance with a line sequence scheme.

A thin-film type sensor is suitable as a high-speed read sensor, and a one-to-one magnification type sensor capable of assuring a large light receiving area is used as a high-sensitivity sensor if the same read resolution as that of the thin-film type sensor is used.

In a color image reading apparatus, a high-sensitivity sensor is required due to a decrease in incident light quantity caused by color separation filters and the spectral sensitivity characteristics of the sensor itself. In order to achieve high-speed reading by using a light source falling within the practical application range, a one-to-one magnification silicon crystal type sensor with stripe filters is most suitable. However, in the silicon crystal type sensor, it is difficult to obtain a long sensor chip which can cover the length (i.e., 297 mm) of an A4 size document due to manufacturing limitations. In recent years, there has been provided a high-speed read sensor wherein a plurality of line sensors are geometrically arranged to constitute a one-line sensor.

When the plurality of line sensors are connected in a line along the main scan direction, a contact sensor is provided wherein the end pixel is arranged to prevent a dark current increase caused by dicing damage for multi-chip formation, the sensitivity distribution is increased near the scribing line, and an original having an A4 size can be read at a resolution of 16 dots/mm.

When a distance between the edges of the connecting portions of the line sensors is taken into consideration, e.g., when a color sensor having three stripe filters at a resolution of 16 dots/mm is taken into consideration, the resolution of the line sensor must be 48 dots/mm. It is difficult to mass-produce such a sensor according to the existing technical know-how. In addition, sensitivity of the multi-chip sections is nonuniform.

In order to solve the above problem, there is an image sensor disclosed in U.S. Pat. Application No. 193,227 filed on May 11, 1988 filed by the assignee of the present invention, wherein a plurality of line sensors are staggered on a chip. With this arrangement, however, an external buffer memory is required to compensate for physical distances between the staggered line sensors on the chip.

In the image sensor having the staggered line sensors, a distance between the staggered line sensors (e.g., 4 lines as the distance between the adjacent line sensors) must be an integer multiple of a size (62.5 μm at the read resolution of 16 dots/mm) of the pixel along the subscan direction. In this manner, image signals from the staggered sensors can be synchronously output along the subscan direction in the one-to-one magnification read mode.

When continuous (actually in units of %) enlargement or reduction is performed by changing a scan rate of an optical system by using the above image sensor, equal sampling times of the line sensors cause read position errors on the original between the line sensors. Therefore, in the image sensor with staggered line sensors, an imaging error occurs between the adjacent line sensors.

As disclosed in U.S. Pat. No. 4,750,048 by the present applicant, variable sampling times are employed to allow appropriate sampling of a given line of the original during reading in an enlargement or reduction mode. Therefore, imaging errors and color misregistration which are caused by the equal sampling times can be eliminated along the subscan direction.

Regarding the variable sampling time of each line sensor, clocks for driving the line sensors are synchronized to prevent interference with output signals generated upon asynchronous driving of the line sensors.

As shown in FIG. 11, in order to actually drive the line sensor, the pulse width of a man scan sync signal φSH for sampling s sufficiently larger (n the case of the two-phase transfer clocks having a frequency of several MHz or more) than those of two-phase transfer clocks φ1A and φ2A. At the same time, during generation of the main scan sync signal φSH, the clock φ1A must be set at "H" level, while the clock φ2A must be set at "I" level. During generation of the main scan sync signal φSH, the two-phase transfer cocks φ1A and φ2A are kept disabled. Therefore, discrete portions appear in the two-phase transfer clocks φ2A and φ2A.

If the sampling times of line sensors CCD-A and CCD-B are equal to each other, the generation intervals of the discrete portions of the clocks φ1A and φ2A for the sensors are the same. Therefore, interference between the CCD-A and the CCD B does not occur, as shown in FIG. 12A.

When the sampling time is variable, however, the intervals of the discrete portions of the clocks φ1A and φ2A for the CCD-A and the CCD-B are changed in accordance with the sampling times.

The influences of the discrete portions of the two-phase transfer clocks φ1A and φ2A appear as a crosstalk signal, as shown in FIG. 12B, in an output signal OS from each CCD arranged on a single substrate, thus causing degradation of image quality.

In this case, the crosstalk signal is generated by the appearance of discrete clock pulses and is superposed as a predetermined offset signal on the output signal from the sensor.

When such crosstalking occurs, a black level signal has a different local offset value. If an image is output as a printer or the like, stripes are formed in a printed image or irregular density distribution occurs.

The assignee of the present invention also disclosed an arrangement in U.S. Pat. No. 4,558,357, in which a plurality of line sensors having different color separation filters are arranged on a single substrate, and color component signals of a color image are obtained according to a line sequential scheme.

With this arrangement, however, since the read positions of the line sensors are shifted from each other along the subscan direction. If continuous reading with enlargement or reduction is performed, crosstalking similarly occurs between the line sensors, as described above.

SUMMARY OF THE INVENTION

The present invention has been made in consideration of the above situation, and has as an object to provide an image reading apparatus which uses a plurality of line sensors to perform good image reading.

It is another object of the present invention to provide an image reading apparatus capable of obtaining good image signals even if the plurality of ine sensors are independently driven.

It is still another object of the present invention to provide an image reading apparatus capable of accurately performing black level correction when an image is read by using the plurality of line sensors.

It is still another object of the present invention to provide an image reading apparatus capable of accurately reading a color image.

It is still another object of the present invention to provide an image reading apparatus for reading an image by using a plurality of line sensors, wherein an output signal from a given line sensor is not adversely affected by the remaining sensors, and good image signals can be obtained.

It is still another object of the present invention to provide an image reading apparatus capable of reading an image at any magnification by using the plurality of line sensors.

The above and other objects, features, and advantages of the present invention will be apparent from the detailed description in conjunction with the accompanying drawings.

BRIEF DESCRIPTION OF THE DRAWINGS

FIG. 3A, 3B are block diagrams showing an arrangement of an image signal processing circuit in the image reading apparatus shown in FIG. 1;

FIG. 4 is a block diagram showing an arrangement of a black level correction circuit;

FIGS. 10A to 10C are timing charts for explaining black level correction operations; and FIGS. 11, 12A and 12B are timing charts of various signals associated with driving of the image sensor.

DETAILED DESCRIPTION OF THE PREFERRED EMBODIMENT

A preferred embodiment of the present invention will be described in detail with reference to the accompanying drawings.

Figure 1:
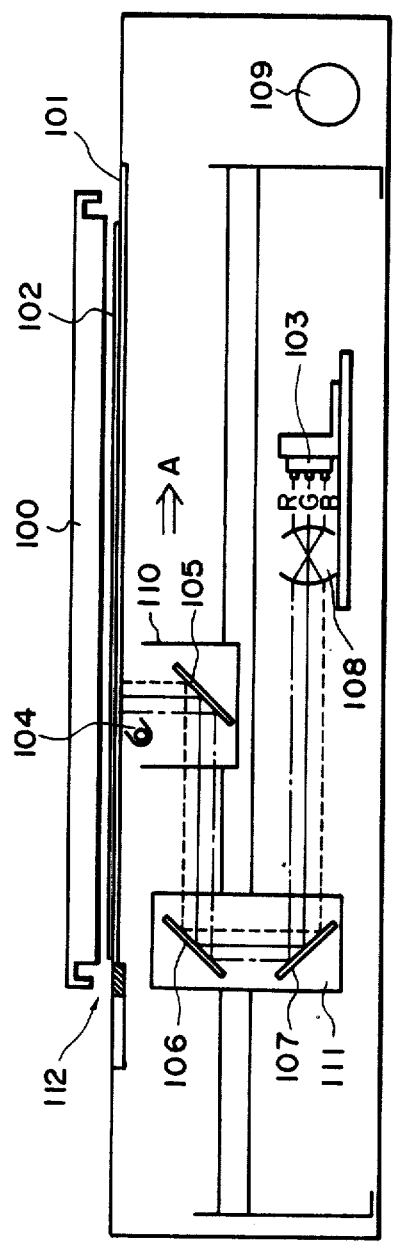
FIG. 1 is a schematic view showing an arrangement of an image reading apparatus according to an embodiment of the present invention.

FIG. 1 shows a schematic internal arrangement of an image reading apparatus according to an embodiment of the present invention.

The image reading apparatus includes an original holder 100 and a glass platen 101 on which an original 102 is placed. A mirror unit 110 comprises an original exposure halogen lamp 104 and a first reflecting mirror 105. A mirror unit 111 comprises a second reflecting mirror 106 and a third reflecting mirror 107. A lens unit 108 reduces and focuses an optical image from the original 102 exposed with light from the halogen lamp 104, so that the reduced optical image is formed on a 3-line color CCD sensor 103. The mirror units 110 and 111 are driven at a scan speed of 2 : 1 in a direction (subscan direction) indicated by an arrow A. The scan speed can be changed in accordance with a selected magnification.

Figures 3, 3B:
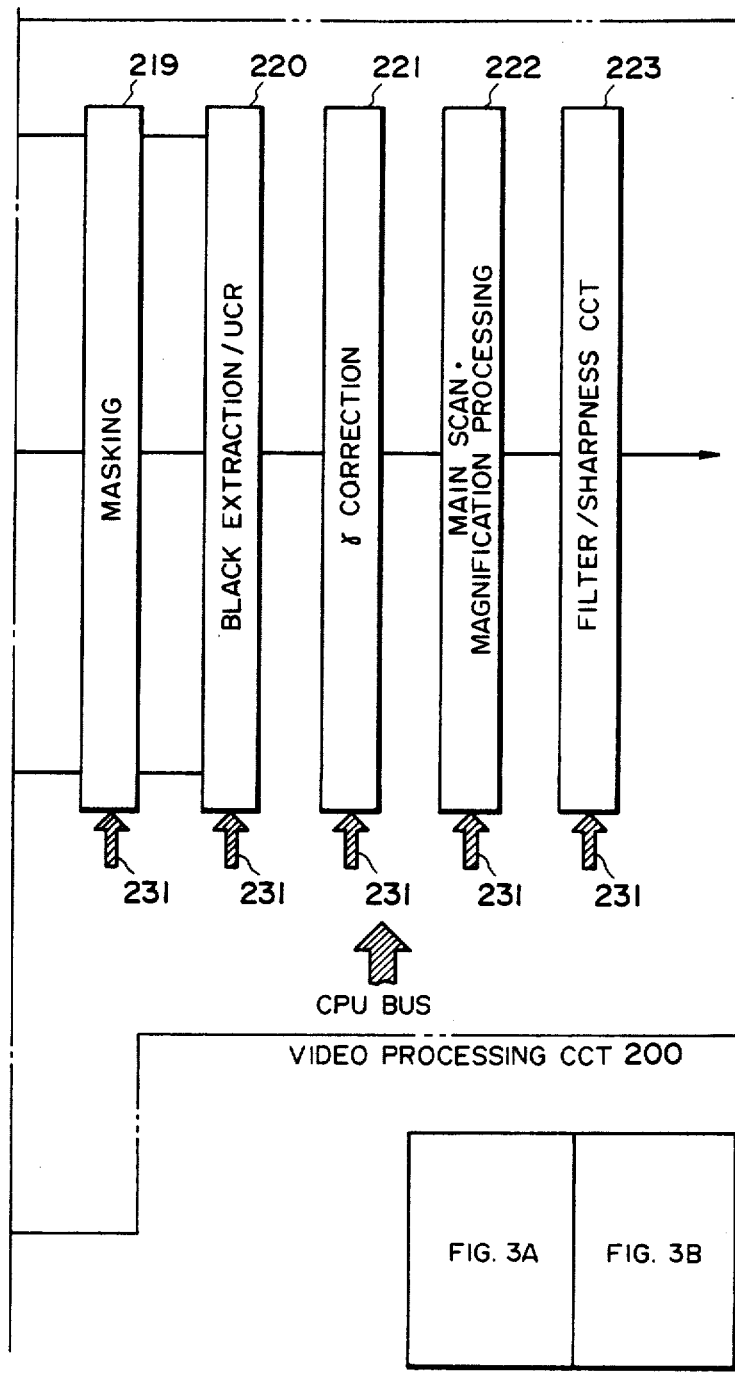
Figure 5A:
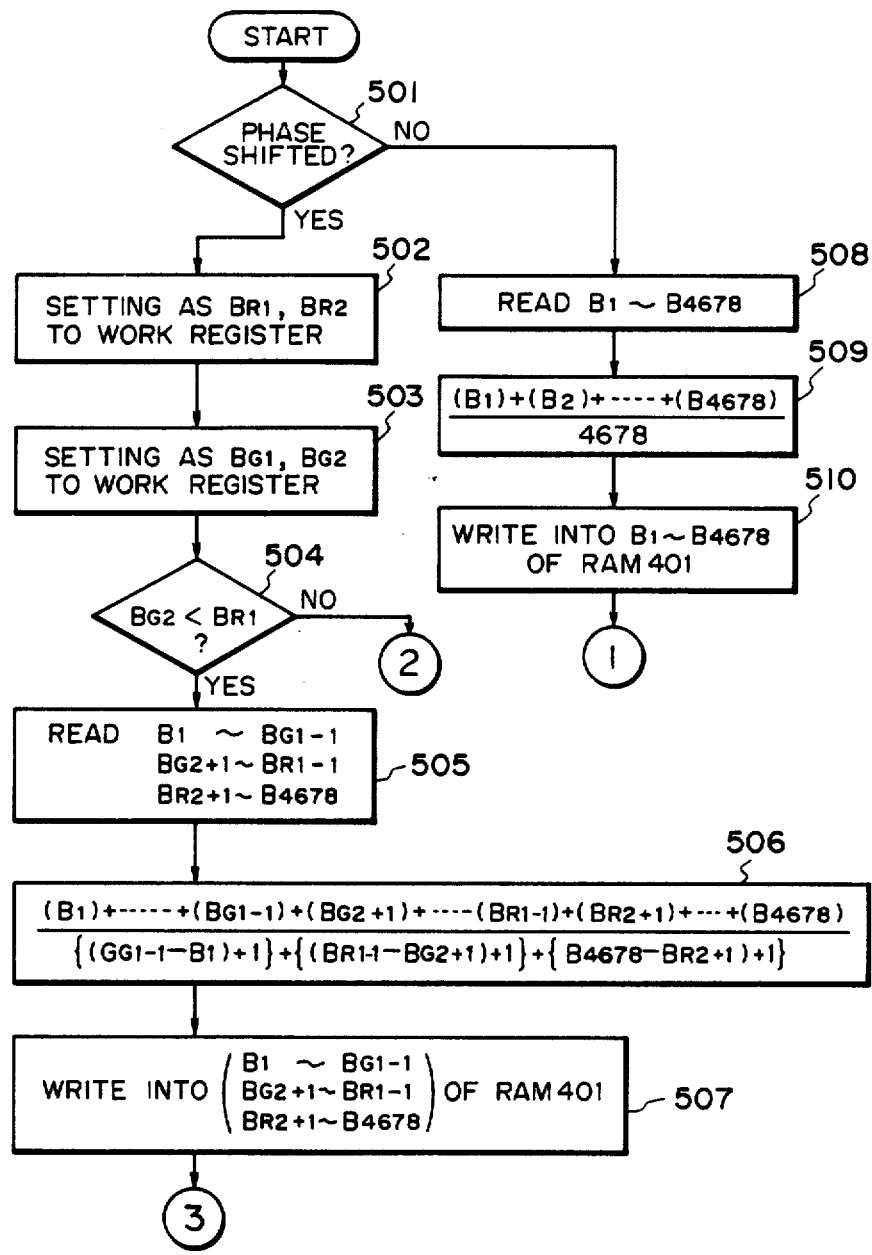
FIGS. 5A to 5E are flow charts for explaining black level correction operations of a CPU.
Figure 5B:
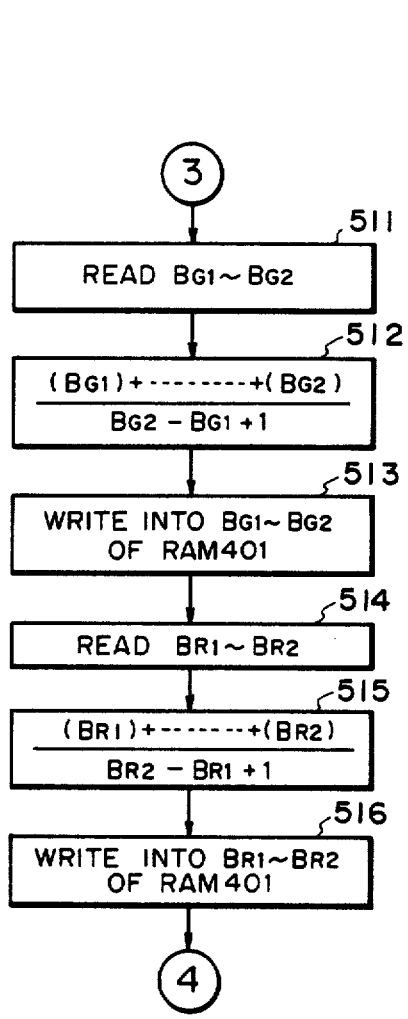
Figure 5C:
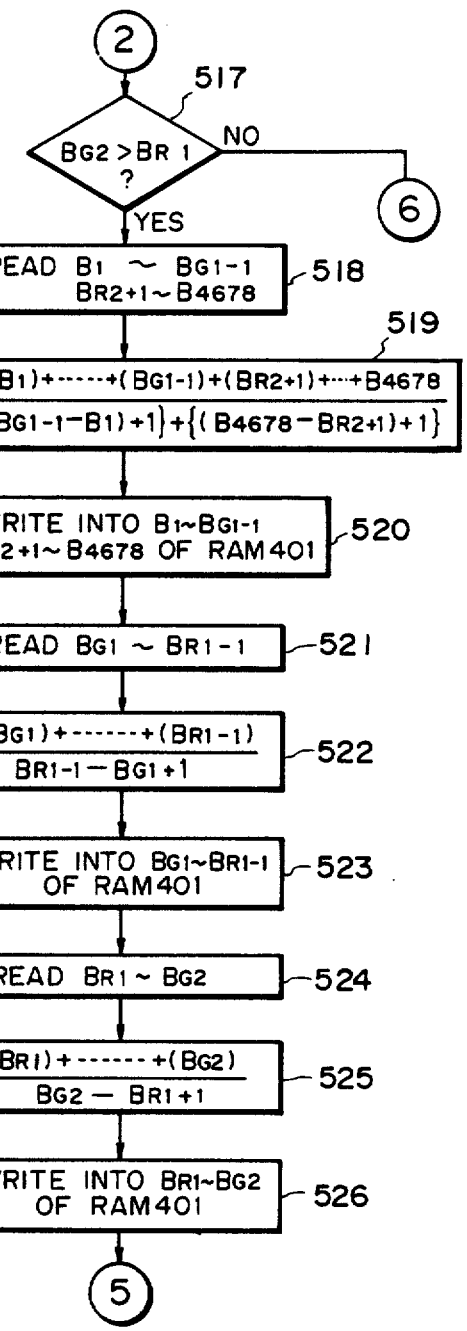
Figures 5D, 5E:
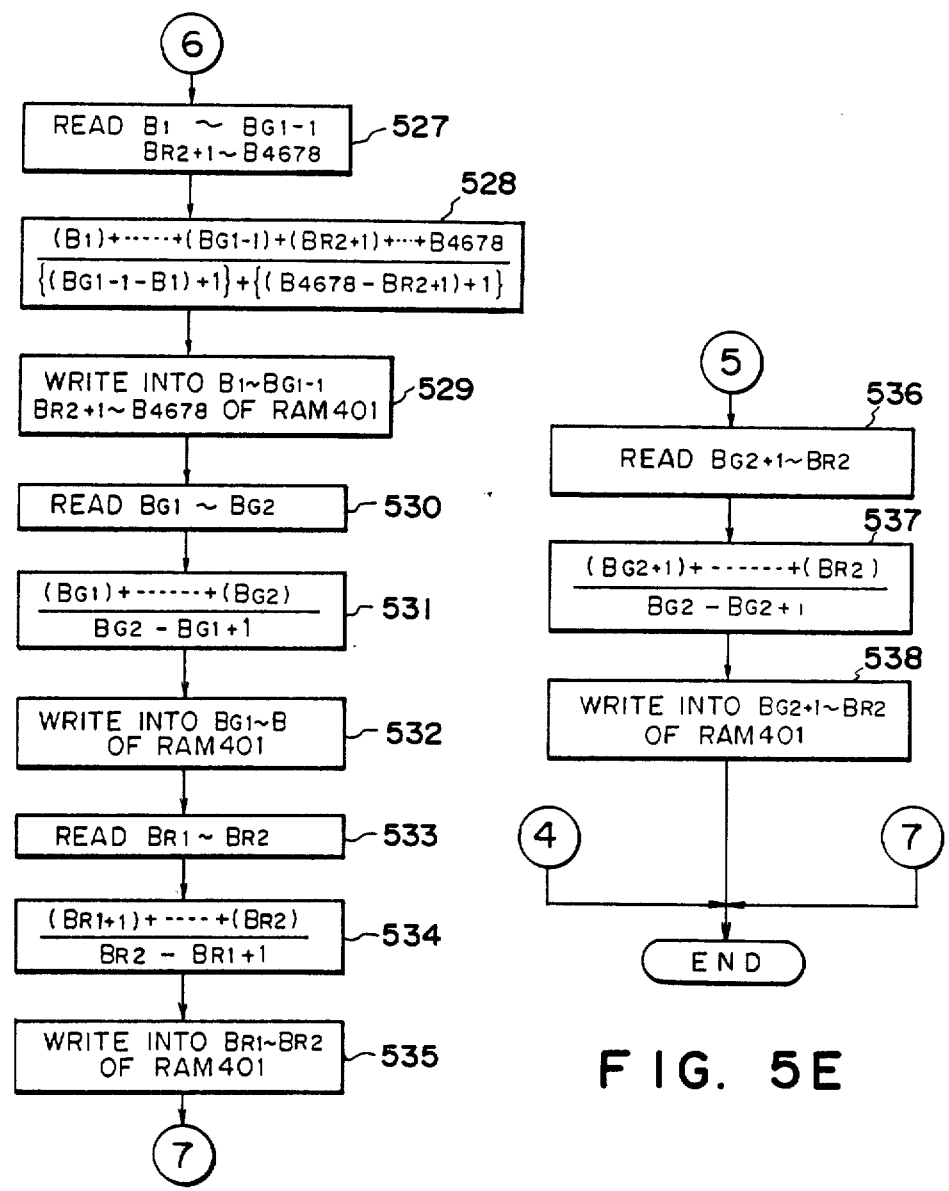

Color separation image signals read line by line by the 3-line color CCD sensor 103 while the original is being exposed and scanned with light are input to and processed by a video processing circuit 200 shown in FIG. 3.

Signal lines 314 are used to independently drive an R-CCD 103a, a G-CCD 103b, and a B-CCD 103c, all of which constitute the 3-line color CCD sensor 103. Drive pulses required in correspondence with a read magnification of the original image are generated by a pulse generator 20.

Referring to FIG. 1, a white board 12 is used to perform white level correction of an image signal (to be described later). Light emitted from the halogen lamp 104 and reflected by the white board 112 is read and scanned by the 3-line color CCD sensor 103 to obtain a predetermined density signal level. This signal level is used for white level correction of a video signal.

The video processing circuit 200 shown in FIG. 3 is controlled by a central processing unit (CPU) 230 through a bus 231.

The video processing circuit 200 will be described in detail. As previously described, the original 102 is irradiated with light emitted from the halogen lamp 104, and light reflected by the original 102 is transmitted through the optical lens 108 via the mirror units 110 and 111 and is focused on the 3-line color CCD sensor 103 in a reduced size. In this case, the optical image is color-separated and read by the 3-line color CCD sensor 103. Outputs from the line sensors, i.e., the R-CCD 103a, the G-CCD 103b, and the B-CCD 103c of the 3-line color CCD sensor 103 are amplified by amplifiers 202, 203, and 204 to have predetermined levels, respectively.

Figure 2:
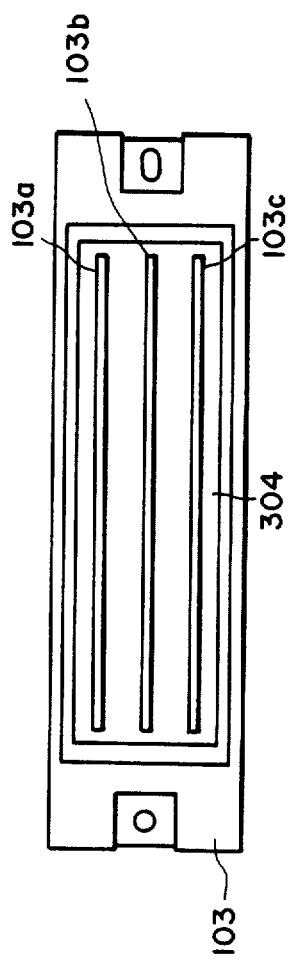
FIG. 2 is a schematic view showing a 3-line color CCD sensor.

FIG. 2 shows an arrangement of the 3-line color CCD sensor 103 shown in FIG. 1. The parallel line sensors, i.e., the R-CCD 103a, the G CCD 103b, and the B-CCD 103c each having 5,000 effective pixels each with a size of $10\mu m \times 10\mu m$ are arranged on a common chip 304 at predetermined intervals of 180 $\mu m$ (18 lines). The line sensors are dyed with R, G, B organic dyes, respectively, and are therefore referred to as the R-CCD 103a, the G-CCD 103b, and the B-CCD 103c hereafter. The CCDs can be independently driven in accordance with a read magnification of the original image and can be synchronously driven.

Video signals $V_R$, $V_G$, and $V_B$ are independently output from the CCDs 103a, 103b, and 103c in synchronism with drive pulses and are amplified by the amplifiers 202, 203, and 204 into predetermined voltage values, respectively. The amplified signals are converted into 8-bit digital data by A/D converters 205, 206, and 207, respectively.

In this embodiment, the CCDs have intervals of 18 lines (10 $\mu$m $\times$ 18 = 180 $\mu$m) in the subscan direction. When viewed from the R-CCD 103a with the red (R) filter for scanning the image first along the read direction A of FIG. 1, the intervals between the R-CCD 103a and the G-CCD 103b with the green (G) filter and between the R-CCD 103a and the B-CCD 103c with the blue (B) filter are 18 lines (180 $\mu$m) and 36 lines (360 $\mu$m). Therefore, the read positions on the original are different in the CCDs 103a, 103b, and 103c.

In order to correctly connect the CCDs, the following correction operations using memories having a capacity of a plurality of lines are performed. In order to synchronize the read timings of the R- and G CCDs 103a and 103b with the read timing of the B-CCD 103c which is used also to read the image, assume that a subscan read density is given as 400 dpi. In this case, in reading with a 100% magnification, a buffer memory 208 for the R CCD 103a has a synchronization capacity of 36 lines. A buffer memory 209 for the G-CCD 103b has a synchronization capacity of 18 lines. If a maximum enlargement coefficient is given as 400%, the numbers of lines of the buffer memories 208 and 209 are 144 (=36=4) and 72 (=18=4). If the long side (i.e., 297 mm) of the A4 size is read at 400 dpi, the number of pixels of one line stored in the buffer memories 208 and 209 is at least 4,678, i.e., the number of effective pixels of one line.

When the B-CCD 103c is used to read a given line which has been read by the R-CCD 103a and the G-CCD 103b, the corresponding color data of the given line are read out from the buffer memories 208 and 209, thereby obtaining the respective color data as color separation data (R, G, and B) of the given line.

When continuous (in units of %) variable magnification reading is to be performed, the number of lines required for synchronization may not be an integer. For example, in a 134% magnification operation, the numbers of lines of the buffer memories 208 and 209 are 48.24 (=36=1.34) and 24.12 (=18=1.34), respectively, thus producing decimal parts. However, the buffer memories can perform only synchronization for integral parts. In order to eliminate the decimal parts, the CCD sampling times of clocks corresponding to the decimal parts are shifted to achieve accurate synchronization.

In the above example, if one-line read time is given as x $\mu$sec and a CCD transfer clock period is given as y nsec, the sampling time of the R-CCD 103a is delayed by 0.24x/y from the sampling time of the B-CCD 103c; and the G-CCD 103b, by 0.12x/y.

However, when the CCD sampling time is set to be variable in accordance with the read magnification of the original, a crosstalk signal appears in the output signal from each CCD to adversely affect the output image. This drawback will be eliminated by black level correction circuits 210, 211, and 212 (to be described later) provided in units of colors.

FIG. 4 shows an arrangement of the black level correction circuit 210, 211, or 212. Since the black level correction circuits 210, 211, and 212 have the identical arrangements, the circuit arrangement is represented by only the black level correction circuit 212. The black level output from each CCD varies between the pixels if the quantity of light incident on the sensor is small. When the above-mentioned crosstalk component is generated, a black level output has an offset during a given interval, as shown in FIG. 12B. If the black level output with an offset is output without processing, stripes are formed in a data portion of an image printed at a printer or the like or irregular density distribution occurs therein. Therefore, output variations in the black portion must be corrected by the circuit shown in FIG. 4.

Prior to reading of an original image, outputs from the CCDs 103a, 103b, and 103c are input to the black level circuits without turning on the halogen lamp 104. A CPU 230 sets data in a latch 408 so as to store a one-line black level image signal input to the $B_{in}$ terminal in a black level RAM 401. The CPU 230 selects the A terminal of a selector 402. In addition, a gate 403 is disabled while a gate 404 is enabled. That is, the black level image signal is input to the RAM 401 through the selector 402 and the gate 404. The A terminal of a selector 406 is selected so that a count output from an address counter 405 initialized by a clock HSYNC synchronized with the start of reading of each line is input to the address input of the RAM 401. Therefore, the one-line black level image signal from the gate 404 is stored in the RAM 401 in accordance with address values $B_1$ to $B_{4678}$ from the address counter 405 (the above mode is defined as a black reference value fetch mode, and the black level image signal stored in the RAM 401 is defined as the black level data).

Since the black level data fetched in the RAM 401 has a very low level, the data tends to be adversely affected by noise generated by the 3 line color CCD 103 and the amplifiers 202, 203, and 204. If the data s used as the black level correction data without processing, the image of the black portion may have poor appearance with noise.

The CPU 230 performs arithmetic operations of the black level data stored in the black level RAM 401 (FIG. 4) in accordance with flow charts of FIGS. 5A to 5E, thereby eliminating cross talk and noise components.

The CPU 230 determines in step 501 whether the CCDs are operated with a phase shift. If NO in step 501, the CPU 230 sets data in the latch 408 in step 508 such that the black data ($B_1$) to stored at addresses $B_1$ to $B_{4678}$ of the black level RAM 401 are fetched in a working register of the CPU 230, the gates 403 and 404 are disabled, the gate 409 is enabled, and the B terminal of the selector 406 is selected. Therefore, the black level RAM 401 is accessed by the address data from the address bus of the CPU 230. The black level data ($B_1$) to ($B_{4678}$) are stored in the working register of the CPU 230 through the gate 409 and the data bus.

In step 509, the black level data ($B_1$) . . .($B_{4678}$) of addresses $B_1$ to $B_{4678}$ fetched in the working register are added to each other, and the sum data is divided by the total number of data "4678". The resultant quotient is temporarily stored in the working RAM. In step 510, the gates 403 and 409 are disabled, and the gate 404 is enabled. In addition, the CPU 230 sets data in the latch 408 so that the B terminals of the selectors 402 and 406 are selected. The data of the working RAM is written again at the addresses $B_1$ to $B_{4678}$ through the selector 402 and the gate 404 in accordance with the address data from the CPU 230. In this manner, the average value of the black level data is calculated to set the black level data free from noise in the RAM 401. In this embodiment, the average value of the black level data of all pixels is calculated to obtain the corrected black level data. However, the data of the central pixel and its adjacent pixels may be weighted or not weighted to obtain the corrected black level data. Alternatively, black level data may be multiplied with different coefficients to obtain the corrected black level data.

When the CCD phase shifting occurs due to reading with a variable magnification, a crosstalk position of the B signal generated by a phase shift of the R-CCD 103a is calculated in step 502 in accordance with the phase shift amount corresponding to the read magnification and the CCD drive parameters. The resultant values are set as black level data addresses $B_{R1}$ and $B_{R2}$ in the working register. In step 503, the crosstalk position of the B signal caused by the phase shift of the G-CCD 103b is calculated in the same manner as in the R-CCD 103a. The resultant values are stored as back level data addresses $B_{G1}$ and $B_{G2}$ in the working register.

Figure 10B:
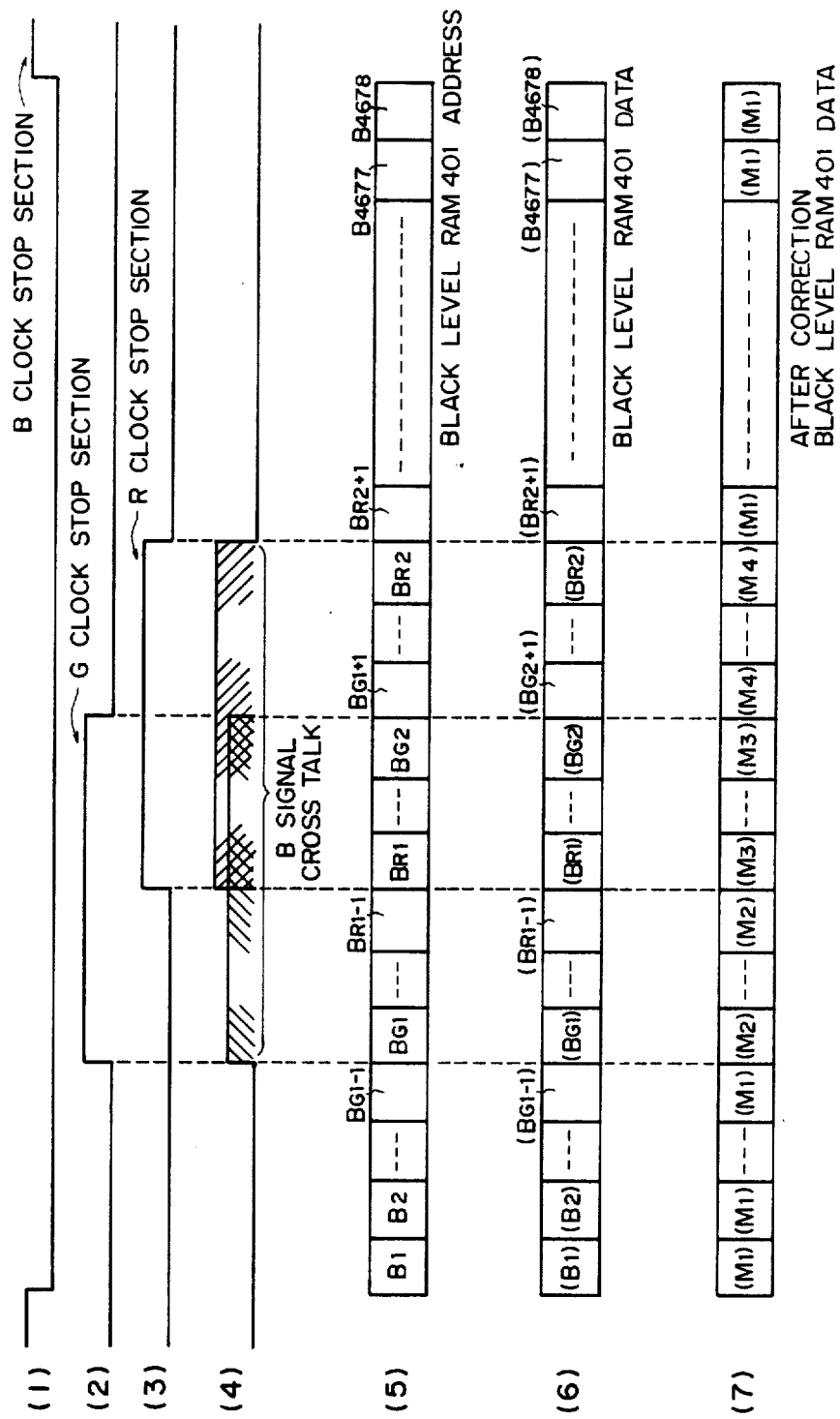
Figure 11:
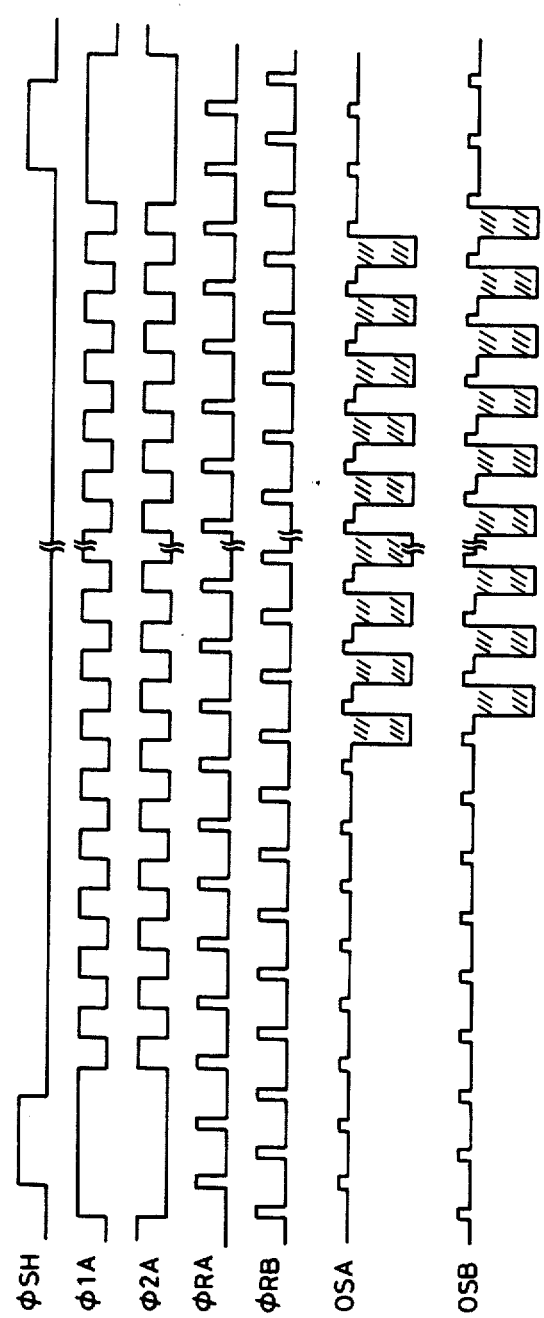

Phase-locking will be described with reference to FIG. 10 wherein a phase shift amount of the R-CCD 103a is larger than that of the G-CCD 103b. The addresses $B_{R1}$ and $B_{G2}$ are compared with each other in step 504. If the crosstalk position of the R-CCD does not overlap that of the B-CCD, i.e., if $B_{G2} < B_{R1}$ is established (FIG. 10A), the CPU 230 sets data in the latch 408 to disable the gates 403 and 404 and enable the gate 409 and to select the B terminal of the selector 406, so that data at addresses B1 to $B_{G1-1}$, $B_{G2+1}$ to $B_{R1-1}$, and $B_{R2+1}$ to $B_{4678}$ selected from all the black data except for the ones at the crosstalk positions and stored in the black level RAM 401, as shown in (6) of FIG. 10A, are stored in the working register of the CPU 230. The black level RAM 401 is accessed to store the black level data in the working register of the CPU 230 through the gate 409 and the data bus.

In step 506, the black level data ($B_1$) to ($B_{G1-1}$), ($B_{G2+a}$) to ($B_{R1-1}$), and ($B_{R2+a}$) to ($B_{4678}$) at addresses $B_1$ to $B_{G1}$, $B_{G2+a}$ to $B_{R1-1}$, and $B_{R2+a}$ to $B_{4678}$ stored in the working register are added to each other, and the sum data is divided by the total number of data, i.e., $\{(B_{G1-1}-B_1)+1\{+\{(B_{R1-1}-B_{G2+a})+1\{+(B_{4678}-B_{R2+a})+1)$. A quotient $M_1$ is temporarily stored in the working RAM. In step 507, the gates 403 and 409 are disabled, and the gate 404 is enabled. In addition, the data is set in the latch 408 to select the B terminals of the selectors 402 and 406. The data in the working RAM is stored again from address $B_1$ to $B_{G1-1}$, $B_{G2+1}$ to $B_{R1-1}$, and $B_{R2+1}$ to $B_{4678}$ of the black level RAM 401 through the selector 402 and the gate 404 in accordance with the address data from the CPU 230, as shown in (7) of FIG. 10A.

In step 511, of all the black level data stored in the black level RAM 401, data at the crosstalk positions generated by the phase shift of the G-CCD, i.e., the black level data ($B_{G1}$) to from address $B_{G1}$ to $B_{G2}$ are fetched in the working register of the CPU 230 in the same manner as in step 505. In addition, in step 512, the data ($B_{G1}$) to ($B_{G2}$) are added to each other, and the sum data is divided by the total number of data, i.e., $(B_{G2}-B_{G1})+1$. A quotient $M_2$ is written at addresses $B_{G1}$ to $B_{G2}$ of the black level RAM 401 in step 513 in the same manner as in step 507.

The data corresponding to the crosstalk positions caused by the phase shift of the R-CCD, i.e., the black level data ($B_{R1}$) to ($B_{R2}$) at addresses $B_{R1}$ to $B_{R2}$ of the black level RAM 401 are fetched in the working register in the same manner as described above. In step 515, the black level data ($B_{R1}$) to ($B_{R2}$) are added and the sum data is divided by the total number of data, i.e., $(B_{R2}-B_{R1})+1$. A quotient $M_3$ is temporarily stored in the working RAM and is written again from addresses $B_{R1}$ to $B_{R2}$ of the black level RAM 401 in step 516.

When the crosstalk position by the G-CCD partially overlaps that of the B-CCD by a plurality of pixels, i.e., if $B_{G2} > B_{R1}$ (FIG. 10B), the area for averaging is divided into regions, i.e., $B_1$ to $B_{G1-1}$ and $B_{R2+1}$ to $B_{4678}$ (of the addresses of the black level RAM 401) regions corresponding to the black level data except for the crosstalk position, a $B_{G1}$ to $B_{R1-1}$ region corresponding to the crosstalk position of the G-CCD, a $B_{R1}$ to $B_{G2}$ region corresponding to the crosstalk positions of both the G-CCD and the R-CCD, and a $B_{G2+1}$ to $B_{R2}$ region corresponding to the crosstalk position of the R-CCD. Averaging of the data of each region is performed to write the processed data $M_1$, $M_2$, $M_3$, and $M_4$ in the corresponding areas of the black level RAM 401, as indicated by (7) of FIG. 10B.

If $B_{G2} = B_{R1}$ (FIG. 10C), the area for averaging is divided into $B_1$ to $B_{G1-1}$ and $B_{R2+1}$ to $B_{4678}$ (of the addresses of the RAM 401) regions, a $B_{G1}$ to $B_{G2}$ region, a $B_{R1+1}$ to $B_{R2}$ region. Averaging is performed using the data of each region, and the resultant data $M_1$, $M_2$, and $M_3$ are written in the corresponding areas of the black level RAM 401.

After the black level data are fetched and corrected as described above, an original image is read. In the original image read mode, the CPU 230 sets data in the latch 408 such that the gates 404 and 409 are disabled, the gate 403 is enabled, and the A terminal of the selector 406 is selected. Therefore, the RAM 401 is set in the data read mode. Corrected black level data $DK_i$ is read out from the black level RAM 401 in units of pixels in accordance with an address value from the address counter 405. The readout data is input to the B input of a subtracter 407 through the gate circuit 403 in synchronism with the image signal input to the $B_{in}$ terminal.

Therefore, an output from the black level correction circuit shown in FIG. 4 appears as $B_{in}(i) - DK(i) = B_{out}(i)$ (i is a pixel address) for the blue (B) signal with respect to the black level data DK(i) (black level correction mode). Similarly, the similar control operations are performed for the green (G) and red (R) signals by the black level correction circuits 211 and 210 having the same arrangement as the black level correction circuit 212 shown in FIG. 4.

In the above description, the phase shift amount of the R-CCD 103a is larger than that of the G-CCD 103b. However, the phase shift amount of the G-CCD 103b is larger than that of the R-CCD 103a in accordance with an enlargement or reduction coefficient. In this case, the addresses $B_{R2}$ and $B_{G1}$ are compared with each other in accordance with the crosstalk positions $B_{G1}$, $B_{G2}$, $B_{R1}$, and $B_{R2}$ which are generated n the back level data of the B-CCD 103c by the G-CCD 103b and the R-CCD 103a. The same operations as described above are performed.

Figure 6:
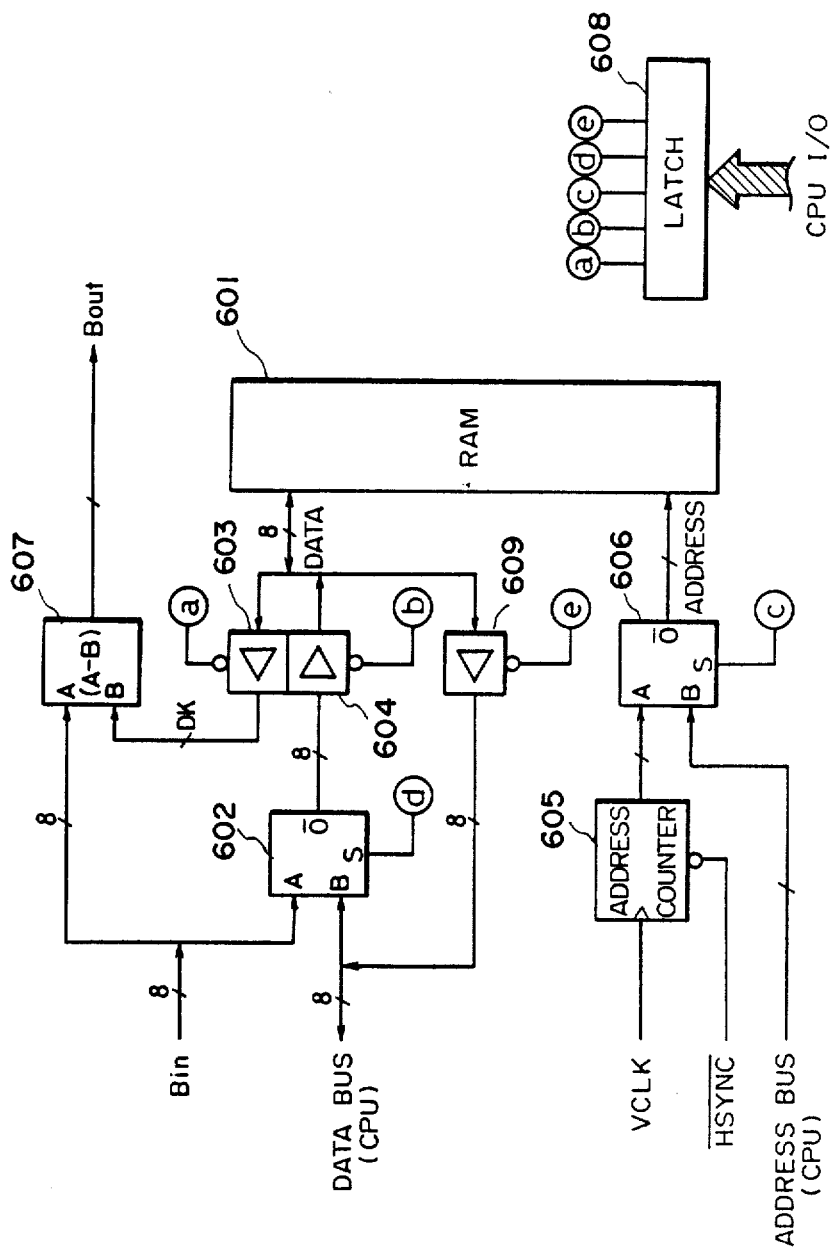
FIG. 6 is a block diagram showing an arrangement of a white level correction circuit.

In this manner, the color data whose black levels are corrected by the black level correction circuits 210, 211, and 212 are input to white level correction (shading correction) circuits 213, 214, and 215, respectively, so that their white levels are corrected. In white level correction, sensitivity variations in the illumination system, the optical system, and the sensors are corrected on the basis of the white level data output from the CCDs 103a, 103b, and 103c upon radiation of the uniform white board 112 with light from the halogen lamp 104. FIG. 6 shows an arrangement of the white level correction circuit 215. The basic circuit arrangement of the white level correction circuit is the same as that of the black level correction circuit shown in FIG. 4. However, a multiplier 607 is used in place of the subtracter in white level correction, while black level correction is performed by the subtracter 407.

Prior to copying or reading, the exposure lamp 104 is turned on to emit light on the white board 112. One-line white image data of a uniform white level output from each CCD is stored in a correction RAM 601 through a selector 602 and a gate 604. The CPU 230 fetches white image data W from the correction RAM 601 to the working register of the CPU through a gate 609 and calculates a coefficient FFH/Wi in units of pixels. The calculated coefficient FH/W s written in the correction RAM 601 again through the selector 602 and the gate 604.

In the original image read mode, the correction data $FF_H/W_i$ is input from the correction RAM 601 to the multiplier 607 through the gate 603 in synchronism with the input image data $D_i$ input to the $B_{in}$ terminal. The multiplier 607 performs a multiplication, i.e., $D_o = D_i = FF_H W_i$ in units of pixels. The product is output as corrected data. The gate and the selector shown in FIG. 6 are operated and controlled in accordance with the data set in a latch 608 under the control of the CPU 30.

As described above, black and white level correction operations of the original image data read by each CCD are performed in accordance with the black level sensitivity, the variations in dark current, optical system light quantity variations, and white level sensitivity of the image input system. The color data proportional to the incident light quantity and uniformed along the main scan direction are input to logarithmic transformation circuits 216, 217, and 218 for performing transformation so as to match the reproduced colors with a human visual sense.

Data output from the logarithmic transformation circuits 216, 217, and 218 for the B, G, R components correspond to density values of the output image obtained by the subtractve primaries of the toners, i.e., yellow, magenta, and cyan, respectively. The B component corresponds to an amount of yellow (Ye) toner, the G component corresponds to an amount of magenta (M) toner, and the R component corresponds to an amount of cyan (Cy) toner. Therefore, color image data correspond to Ye, M, and Cy hereinafter.

Figure 7:
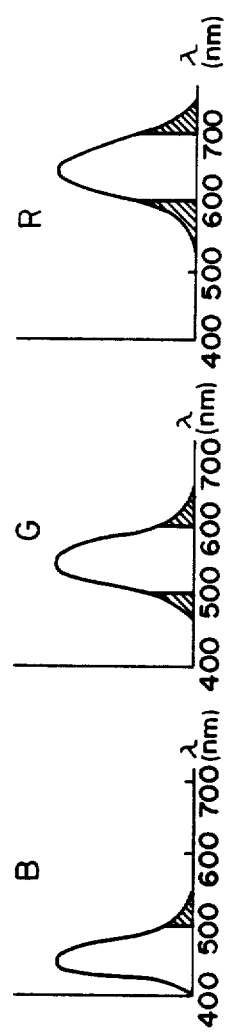
FIG. 7 is a graph showing characteristics of color separation filters.
Figure 8:
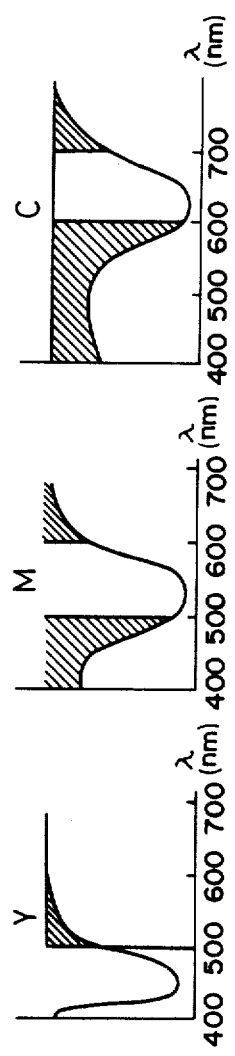
FIG. 8 is a graph showing characteristics of color toners.

Color correction of the respective color component image data, i.e., the Ye component data, the M component data, and the Cy component data of the original which are obtained by logarithmic transformation by the logarithmic transformation circuits 216, 217, and 218 is performed by a masking circuit 219. The spectral characteristics of the color separation filters arranged in the 3-line color CCD sensor 103 in this embodiment include unnecessary transmission regions indicated by hatched regions in FIG. 7. Similarly, the color toners (Y, M, and C) to be transferred to the transfer sheet have unnecessary absorption components shown in FIG. 8. Therefore, the masking circuit 219 performs masking correction, i.e., color correction for performing calculations in units of color components as follows:

$$\begin{bmatrix} Y_o \\ M_o \\ C_o \end{bmatrix} = \begin{bmatrix} aY_1 & -bM_1 & -cC_1 \\ -aY_2 & bM_2 & -cC_2 \\ -aY_3 & -bM_3 & cC_3 \end{bmatrix} \begin{bmatrix} Y_i \\ M_i \\ C_i \end{bmatrix}$$

A minimum value $Min(Y_1, M_i, C_i)$ of the color component data $Y_i$, $M_i$, and $C_i$ is calculated, and the calculated value is defined as a back value (Indian ink value). A black extraction/UCR circuit 220 calculates an amount of black toner to be added later on and undercolor reduction (UCR) for reducing amounts of color materials to be added in accordance with the amount of black component added.

The color signals obtained by masking correction of the masking circuit 219 and the UCR and blacking by the black extraction/UCR circuit 220 are subjected to $\gamma$-correction by a $\gamma$-correction circuit 221 and main scan variable magnification control by a main scan magnification circuit 222 as needed. Edge emphasis and smoothing of the color signals are performed by a filter/sharpness circuit 223.

Figure 9:
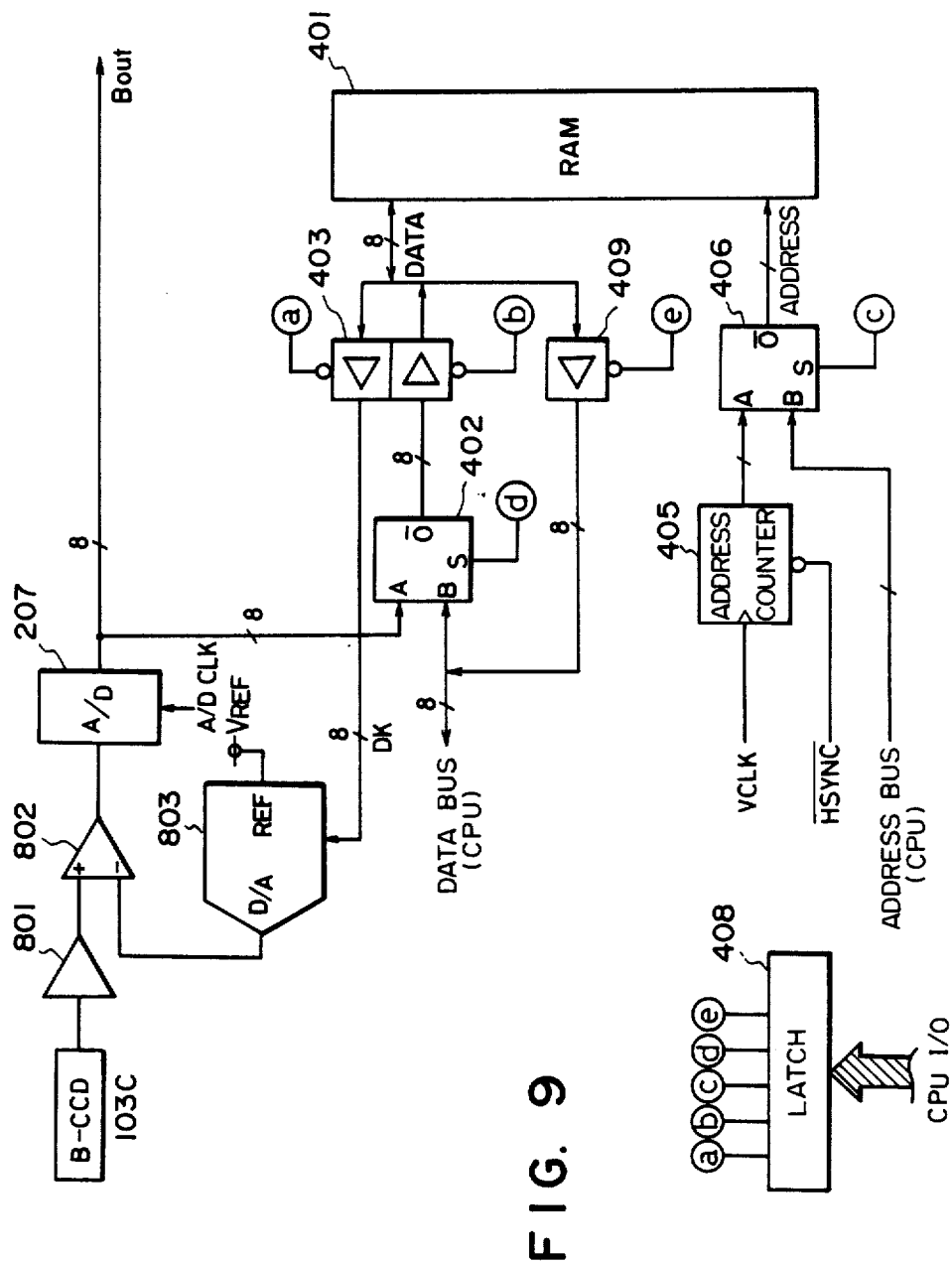
FIG. 9 is a block diagram showing another arrangement of the black level correction circuit.

FIG. 9 shows another arrangement of the black level correction circuit. In the black level correction circuit shown in FIG. 4, the black level data DK read out from the black level RAM 401 is input to one input of the subtracter 407, and the read image signal is input to the other input thereof, and digital processing is performed. Unlike in the above black level correction circuit, in the B-CCD section of the circuit of FIG. 9, an amplifier 801, a differential amplifier 802, and a D/A converter 803 are used in place of the amplifier 204 shown in FIG. 3. In addition, the DK signal as the data of the D/A converter 803 stored in the black level RAM 401 in the same manner as in FIG. 4 is used.

Prior to the black reference value read mode, a DK value (e.g., if an output from the D/A converter 803 is given as $V_{OUT}$, an output value as $V_{OUT} = (-V_{REF}/255) = DR$ is output) $00_H$ (H is the hexadecimal notation) which causes zero output of the D/A converter 803 under the control of the CPU 230 is sent from the data bus to the selector 402 and the gate 404 and is written at the addresses $B_1$ to $B_{4678}$ of the RAM 401. The gate 403 is then enabled, while the gate 404 is disabled, and $DK = 00_H$ is input to the D/A converter 803 prior to fetching of the black reference value. An output voltage of 0 V is input to the inverting input terminal of the differential amplifier 802.

In the black reference value fetch mode, an output signal from the B-CCD 103c during the OFF period of the halogen lamp 104 is amplified by the amplifier 801 to a predetermined voltage which is then subtracted from 0 V by the differential amplifier 802. Therefore, the noncorrected data is converted into digital data by the A/D converter 207. In the manner as in the black reference value fetching mode described with reference to FIG. 4, the corresponding one-line black level data is written in the RAM 401. The CPU 230 fetches the data from the RAM 401 and performs noise correction by averaging. The corrected data is then stored again in the RAM 401.

In the black level correction mode, the black level correction data DK stored in the RAM 401 are output to the D/A converter 803 in units of pixels in synchronism with image data from the B-CCD 103c. The black levels are corrected by the differential amplifier 802 in units of pixels in accordance with the output from the D/A converter 803. The image data whose black level is corrected is converted into digital data by the A/D converter 207 and the corrected data is output to the white level correction circuit 215. Similar operations are performed for the R-CCD 103a and the G-CCD 103b.

In this manner, after the output signals from the image sensor in units of color components are A/D-converted, and the A/D-converted data is offset in units of pixels corresponding to bits. The converted data is then shaded, so that the the dynamic range of the signal levels from the reference black to the reference white level in each image sensor chip can be quantized. Therefore, the all read values of the image sensor in all gray scale levels from the reference black to the reference white can be equal to each other.

The signal level of the reference black is very low and may be offset due to influences of various noise components. However, the signal from the image sensor is averaged in the main scan direction, replaced with the reference black signal by using the average signal, and is uniformly offset. Therefore, influences of high-frequency noise, i.e., stripes in the image in the subscan direction can be eliminated.

Superposing of the crosstalk signal appearing in each sensor output on the reference black signal upon independent and variable control of the sampling times of the sensors is taken into consideration. The signals from the image sensor are not uniformly averaged in the main scan direction, but all drive clocks for the sensors are synchronized. The control amount of the sampling time in the variable magnification mode is controlled in synchronism with the drive clocks. Therefore, (1) the position and width of the crosstalk can be detected, and (2) the crosstalk portions and other portions can be separated from each other, and averaging of these portions can be independently performed. In addition, black offset processing of this signal is performed. Therefore, even if the reference black signal includes the crosstalk signal, offset processing which does not adversely affect the image can be performed.

The present invention has been described with reference to the preferred embodiment but is not limited thereto. For example, the present invention is also applicable to a two-color reading apparatus employing two sensors, i.e., the red and black sensors, and a monochromatic or multicolor image reading apparatus employing on image sensor having staggered CCDs.

When crosstalk signals between the image sensors using variable sampling times of the plurality of image sensors are to be corrected using black level signals, the crosstalk portions and other portions can be separated from each other, and black level correction signals are generated independently for the crosstalk portions and other portions. The crosstalk portions and other portions are corrected by different correction values by using the black level correction signals. Therefore, when the variable sampling times of the plurality of image sensors formed on a single substrate are independently controlled, the crosstalk signals and noise components can be eliminated, thereby preventing stripes and irregular density distribution in the subscan direction of the image.

The present invention has been described with reference to the preferred embodiment. However, the present invention is not limited to this. Various changes and modifications may be made within the spirit and scope of the appended claims.

What is claimed is:

1. An image reading apparatus comprising:
a plurality of line sensors for reading an image;
driving means for independently driving said plurality of line sensors; and
correcting means for correcting black levels of output image signals from said plurality of line sensors,
wherein said correcting means performs different black level correction operations for crosstalk portions than for other portions generated by said plurality of line sensors.

2. An apparatus according to claim 1, wherein said plurality of line sensors comprise different color separation filters.

3. An apparatus according to claim 1, wherein said driving means drives said plurality of line sensors in accordance with a read magnification of the image.

4. An apparatus according to claim 1, wherein said correcting means corrects the black levels in accordance with black reference signals output from said plurality of line sensors.

5. An apparatus according to claim 1, wherein each of said plurality of line sensors reads a different image line of an original.

6. An image reading apparatus comprising:
a plurality of line sensors for reading an image;
memory means for storing black reference signals output from said plurality of line sensors; and
correcting means for correcting black levels of output image signals from said plurality of line sensors on the basis of the black reference signals stored in said memory means,
wherein said correcting means divides at least one black reference signal stored in said memory means into a plurality of portions and corrects the black levels of the corresponding image signals on the basis of the divided black reference signal portions.

7. An apparatus according to claim 6, wherein said plurality of line sensors comprise different color separation filters.

8. An apparatus according to claim 6, wherein said correcting means divides the at least one black reference signal into crosstalk portions and other portions generated by said plurality of line sensors.

9. An apparatus according to claim 6, wherein each of said plurality of line sensors reads a different image line of an original.

10. An image reading apparatus comprising:
a plurality of line sensors for reading an image;
driving means for independently driving said plurality of line sensors; and
a plurality of correcting means, respectively coupled to said plurality of line sensors, for correcting black levels of output image signals from said plurality of line sensors,
wherein each of said plurality of correcting means performs black level correction also utilizing crosstalk portions provided by line sensors other than the line sensor corresponding to said each correcting means.

11. An apparatus according to claim 10, wherein said plurality of line sensors comprise different color separation filters.

12. An apparatus according to claim 10, wherein said driving means drives said plurality of line sensors in accordance with a read magnification of the image.

13. An apparatus according to claim 10, wherein said correcting means performs different black level correction operations for the crosstalk portions than for other portions.

14. An apparatus according to claim 10, wherein each of said plurality of line sensors reads a different image line of an original.

* * * * *

UNITED STATES PATENT AND TRADEMARK OFFICE
CERTIFICATE OF CORRECTION

PATENT NO. : 4,974,072

DATED : November 27, 1990

INVENTOR(S) : Shizuo HASEGAWA

It is certified that error appears in the above-identified patent and that said Letters Patent is hereby corrected as shown below:

COLUMN 1:

Line 55, "damage for" should read --damage. For--.

COLUMN 2:

Line 36, "man" should read --main--;

Line 37, "s" should read --is-- and "(n" should read --(in--;

Line 44, "cocks" should read --clocks; and

Line 68, "as" should read --at--..

COLUMN 3:

Line 11, " direction. If" should read --direction, if--; and

Line 23, "ine" should read --line.

COLUMN 4:

Line 38, "pulse generator 20." should read --pulse generator 201.--;

Line 39, "white board 12" should read --white board 112--.; and

UNITED STATES PATENT AND TRADEMARK OFFICE
CERTIFICATE OF CORRECTION

PATENT NO. : 4,974,072

DATED : November 27, 1990

INVENTOR(S) : Shizuo HASEGAWA

It is certified that error appears in the above-identified patent and that said Letters Patent is hereby corrected as shown below:

Line 63, "G CCD 103b," should read --G-CCD 103b,--.

COLUMN 5:

Line 2, " hereafter." should read --hereinafter--;

Line 25, "G CCDs" should read --G-CCDs--;

Line 27, "also" should read --last;

Line 30, "R CCD 103a" should read --R-CCD 103a--;

Line 35, "(=36=4)" should read --(=36 x 4)--; and

Line 51 "48.24 (=36=1.34)" should read --48.24 (=36 x 1.34)--."

COLUMN 6:

Line 39, "3 line" should read --3-line--;

Line 40, "s" should read --is--;

line 52, the correction should read --to ($B_{44678}$) stored--."

COLUMN 7:

Line 31, "$B_{G2} < B_{R1}$" should read --$B_{G2} < B_{R1}$--;

Line 32, "(Fig. 10A," should read --(FIG.10A),--;

line 46, "$B_{G1'}$" should read --$B_{G1-1'}$--; and "$B_{R1-1}$," should read --$B_{R1-1'}$--."

UNITED STATES PATENT AND TRADEMARK OFFICE
CERTIFICATE OF CORRECTION

PATENT NO. : 4,974,072

DATED : November 27, 1990

INVENTOR(S) : Shizuo HASEGAWA

Page 3 of 4

It is certified that error appears in the above-identified patent and that said Letters Patent is hereby corrected as shown below:

Line 35, "addresses Bl" should read --addresses $B_1$--; and

Line 45, "$(B_{G2+a})$" should read --$(B_{G2+1})$--; and "$(B_{R2+a})$" should read --$(B_{G2+1})$--;

Line 46, "$(B_{G2+a})$" should read --$(B_{G2+1})$--; and "$(B_{R2+a})$" should read --$(B_{G2+1})$--."

Line 49, "$\{(B_{G1-1} - B_1) + 1 \{+\{(B_{R1-}$" should read --$\{(B_{G1-1} - B_1) + 1\} + \{(B_{R1-1} - B_{GZ+1}) + 1\} + \{B^{4678} - B^{RZ+1}) + 1\}$.--

Line 50, "$1 - B_{G2+a}) + 1\{+ (B_{4678} - B_{R2+a}) + 1)$." should be deleted; and Line 63, "to from" should read --to $(B_{G2})$ from--.

COLUMN 8:

Line 63, "n" should read --in--.

COLUMN 9:

Line 20, "image data W" should read --image data $W_i$--;

Line 22, "coefficient FFH/Wi" should read --coefficient $FF_H/W_i$ is--;

Line 23, "coefficient FH/W s should read --coefficient $FF_H/W_i$--;

UNITED STATES PATENT AND TRADEMARK OFFICE
CERTIFICATE OF CORRECTION

PATENT NO. : 4,974,072
DATED : November 27, 1990
INVENTOR(S) : Shizuo Hasegawa

Page 4 of 4

It is certified that error appears in the above-indentified patent and that said Letters Patent is hereby corrected as shown below:

Line 27, "$FF_H/Wi$" should read --$FF_H/W_i$--

Line 31, "=$FF_HWi$" should read --x$FF_H/W_i$--."

Line 34, "CPU 30." should read --CPU 230.--; and

Line 49, "subtractve" should read --subtractive--.

COLUMN 10:
   Line 12, "back" should read --black--.
   Line 43, "$V_{REF}/255)=DR$" should read --$V_{REF}/255)XDK$--; and
   Line 49, "$DK=OO_H$" should read --$DK=OO_H$--.

COLUMN 11:
   Line 51, "on" should read --an--.

This certificate supersedes the Certificate of Correction issued on September 15, 1992.

Signed and Sealed this

Twenty-eighth Day of June, 1994

*Attest:*

BRUCE LEHMAN

*Attesting Officer*     *Commissioner of Patents and Trademarks*